Sept. 8, 1953

T. L. MORRIS
AUTOMATIC TRANSMISSION 2,651,218

Filed Feb. 12, 1952

INVENTOR.
THOMAS L. MORRIS,
BY
Jesse P. Whann
ATTORNEY

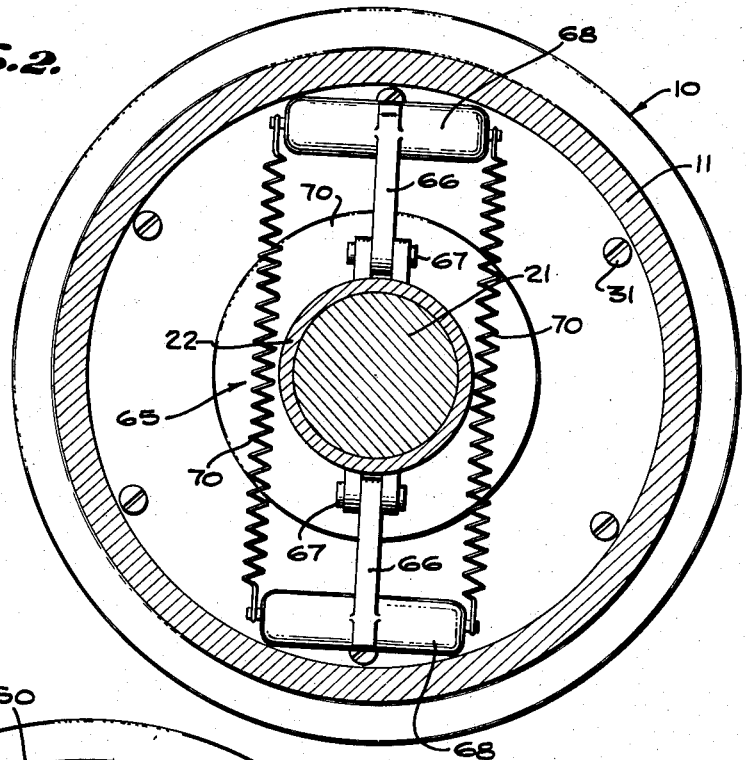
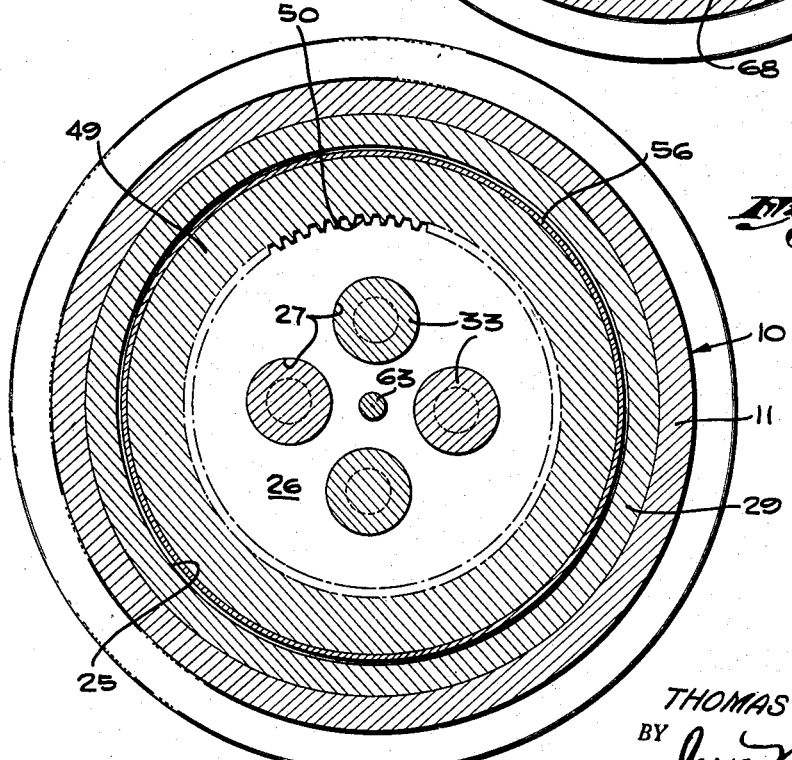

Patented Sept. 8, 1953

2,651,218

UNITED STATES PATENT OFFICE 2,651,218

AUTOMATIC TRANSMISSION

Thomas L. Morris, Canoga Park, Calif., assignor of one-half to Floyd M. Boes, North Hollywood, Calif.

Application February 12, 1952, Serial No. 271,150

6 Claims. (Cl. 74—752)

This invention relates to improvements in transmissions of the so called gearless type, one form of which is shown in U. S. Patent No. 2,408,574 granted to me October 1, 1946, for Hydraulic Transmission.

It is an object of the invention to provide a transmission of the general character shown herein which has a single reduction gear set, the gears of which are continuously in mesh, but which is active only during that portion of the operation of the transmission wherein the speed ratio between the first and second shafts is advancing between low speed ratio and high speed or direct drive.

A further object of the invention is to provide a transmission of this general character having one part rotatable relatively to another part around a common axis, one of these parts carrying a plurality of yieldably disposed reaction members adapted to be depressed by a wobble plate, and the other of the parts having differential gear means for causing a roller to roll in engagement with the wobble plate at a speed of revolution around the axis of the drive and driven parts which is one-half the speed of revolution of the drive part, or one-half the speed of revolution of the driven part, should the connection of the rotatable parts be reversed, the differential gear means being planetary in character and having a pair of ring gears and at least one planetary pinion gear to rotate or roll between the ring gears.

In the present invention the roller which engages the wobble plate is carried by the rotary support which also carries the planetary pinion gear; therefore, the roller revolves around the axis of the device at a rate which is characteristic of planetary action.

A further object of the invention is to provide a transmission having a planetary gear mechanism for the operation of the wobble plate, the mechanism being movable as a unit longitudinally of the transmission and having a member which engages the wobble plate and moves longitudinally with the transmission so as to change the angularity of the wobble plate.

A further object of the invention is to provide a transmission of the type having a wobble plate which engages reaction members such as hydraulically controlled pistons, for example, wherein the angularity of the wobble plate is automatically controlled by a simplified arrangement of parts and wherein means are provided for locking the control mechanism in either active or inactive condition.

Further objects and advantages of the invention may be brought out in the following part of the specification wherein I have described details of a preferred form of the invention for the purpose of making a complete disclosure, without limiting the scope of the invention set forth in the appended claims.

Referring to the drawings which are for illustrative purposes only:

Fig. 2 is a cross-sectional view taken as indicated by the line 2—2 of Fig. 1, and Fig. 3 is a cross-sectional view taken as indicated by the line 3—3 of Fig. 1.

Figure 1:
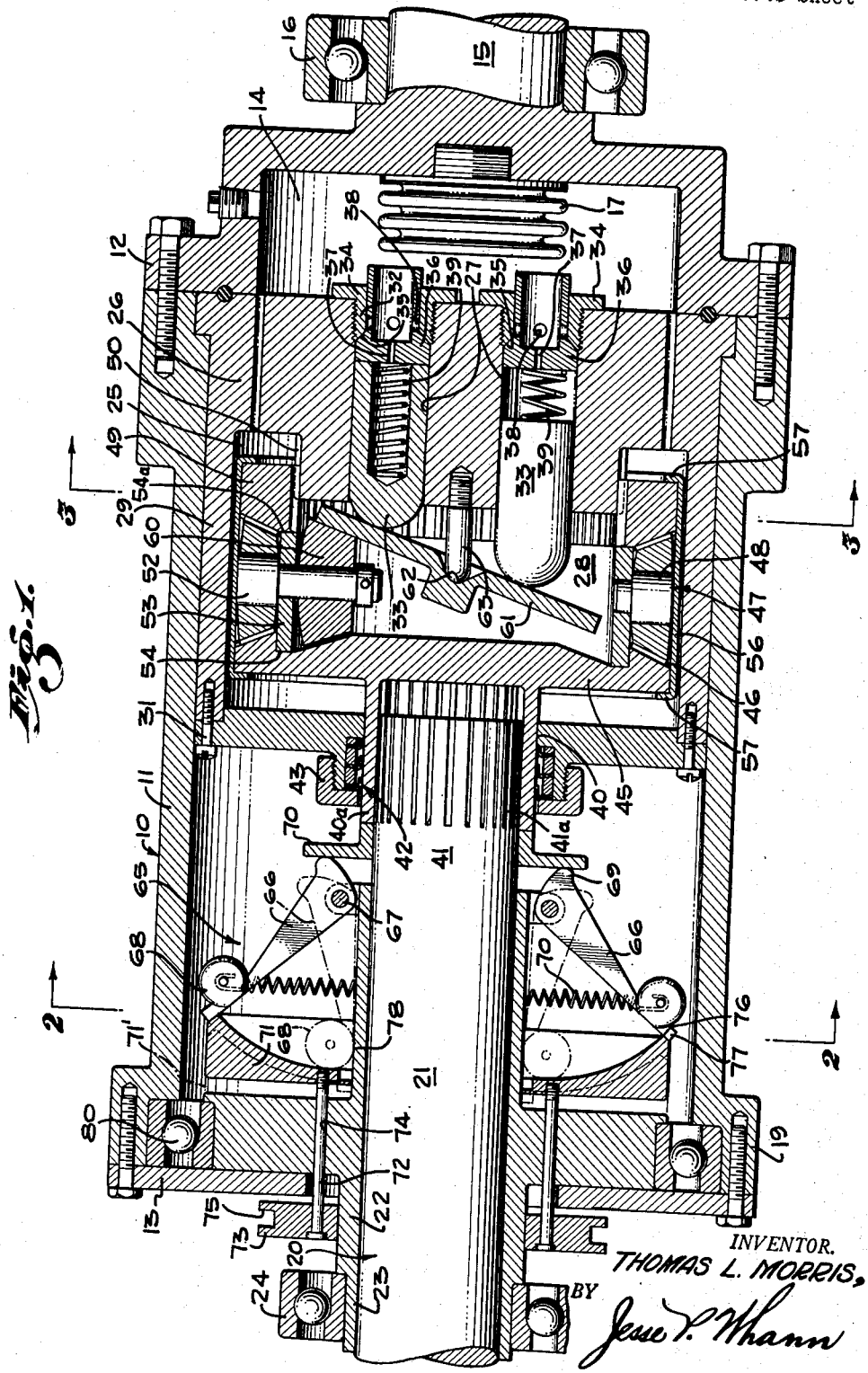
Fig. 1 is a longitudinal sectional view of the preferred form of the invention.

The variable speed transmission includes a shell 10 comprising a cylinder 11 arranged to receive closures 12 and 13 at the opposite ends thereof. The closure 12 comprises a head having a cavity 14 facing inwardly, and an axially extending shaft element 15 arranged to be supported by bearing means 16 which may be carried by a supporting frame-work, not shown. The cavity 14 has therein at least one volume compensating member 17, shown as a metal bellows having a closed inner end and having the opposite end thereof connected through a passage 18 with the exterior of the head 12.

The closure 13 is in the form of an annulus which is bolted onto the end 19 of the cylinder 11, and has a central opening through which shaft means extends into the interior of the shell 10. The shaft means 20 comprises a shaft proper 21 and a sleeve 22 which is mounted on the shaft 21. The sleeve 22 has a shoulder portion 23 for engagement with radial bearing means 24 which is also supported by a suitable supporting framework, not shown.

Within the rightward end of the shell 10 there is a variable reaction unit 25 having a threaded end 26 confronting the head 12. The unit 25 has a plurality of cylinder bores 27, the leftward ends of which communicate with a chamber 28 defined by a cylindrical wall 29 and an end wall 30 which is secured to the end of the cylindrical wall 29 by screws 31. Pistons 33 are arranged in the cylinders 27 so as to project into the chamber 28, and at the rightward end of each cylinder 27 there is a check valve 32 adapted to restrict flow of liquid from the cylinder into the cavity 14 when the piston 33 therein is moved rightwardly, and permit a relatively free flow of liquid from the cavity 14 into the cylinder 27 when the piston 33 therein moves leftwardly. Each valve 32 comprises a bushing 34 threaded into the rightward end of a cylinder bore 27 and having a valve seat 35 at its leftward end. A hollow poppet valve member 36 is slidably disposed within the pop-bushing 34. The transverse end wall of the poppet valve member 36 has therein a small flow restricting orifice 37, and has a plurality of radial openings 38 near the leftward end thereof for free flow of liquid from the cavity 14 to the cylinder 27 when the poppet valve member 36 is shifted leftwardly with respect to the valve seat 35. The pistons 33 are of hollow construction and contain springs 39 arranged in compression to urge the pistons 33 leftwardly and the valve closures 36 rightwardly.

The closure 30 has an axial bore 40 which receives the hub 40a of a gear member 45 which is disposed within the chamber 28. This hub 40a has a splined opening 41a which receives the rightward end 41 of the shaft 21. Oil sealing rings 42 are disposed in the bore 40 and in engagement with the outer surface of the hub 40a, for preventing escape of oil from the chamber 28. The sealing rings 42 are held in place by a ring nut 43.

On the inner end of the shaft 21 there is, within the chamber 28, a disc 44, the peripheral portion of this disc 44 comprising the gear 46 which is a part of a differential gear mechanism or unit 47 including a plurality of small planetary gear members 48 and a gear 49 which is placed on the opposite side of the gears 48 from the gear 46. The gear 49 makes engagement through splines 50 with the interior part of the end wall portion 26 of the reaction unit 25, so that this ring gear 49 may have limited axial movement as required in the operation of the mechanism.

The planetary gears 48 are supported by pins 52 which extend radially from a short metal cylinder 53, the ends 54 and 54a of which make engagement respectively with the members 45 and 49 so as to act as a thrust bearing between these members. Separation of the gear members 46 and 49 is prevented by a split cylindrical shell 56 which surrounds these gear parts 46 and 49 and also the parts 48 and 53 disposed therebetween, there being inwardly turned flanges 57 at the ends of the shell 56 to limit separation of the ring gears 46 and 49.

Within the cylinder 53 there is a conical roller 60 which is rotatably mounted on the inwardly extending portion of one of the pins 52. The roller 60 is arranged to engage a peripheral portion of a wobble plate 61 which is disposed in the chamber 28 across the ends of the pistons 33. This wobble plate 61 has in its rightward face a central socket 62 to engage the leftward end of a pin 63 which projects axially from the transverse wall portion 26 of the unit 25. The plate 61 is caused to wobble by the roller 60 as it is moved through a circular path because of the rolling of the planetary gears 48 between the gears 46 and 49.

The differential gear unit 47 is automatically adjusted in rightward direction by application of pressure to the leftward end of the hub 40a. This is accomplished by the centrifugal means 65 arranged to be driven by the shaft 21. The centrifugal means 65 is shown as comprising levers 66 swung on pins 67 carried by the inner end of the sleeve 22. These levers 66 carry weights 68 in spaced relation to the pins 67, and are arranged to swing with the levers 66 from positions close to the sleeve 22, as indicated by dotted lines 68' in Fig. 1, to the positions thereof indicated in full lines. The levers 66 also have thereon cams 69 placed so as to engage the leftward face of a collar 70 which is disposed around the shaft 21 in engagement with the leftward end of the hub 40a. Suitable springs 70 are employed to urge the levers 66 into the retracted positions thereof shown in dotted lines 68'.

Means are provided for holding the levers 66 in either retracted or extended position. A ring 71 surrounds the portion of the sleeve 22 adjacent the levers 66, and the leftward ends of rods 72 are employed to connect an externally placed ring 73 with the ring 71, the inner or rightward ends of the rods 72 passing through openings 74 in an enlarged portion of the sleeve 22 and being threaded into the ring 71. The shifting ring 73 has an external groove adapted to be engaged by a shifting yoke, not shown, to effect movement of the locking ring 71 between the position in which it is shown in full lines in Fig. 1 to the dotted line position thereof, 71'. The ring 71 has an outer shoulder 76 arranged to engage the ends 77 of the levers 66 when they are in fully extended positions, as shown in full lines, and inner shoulders 78 arranged to engage the ends 77 of the levers 66 when they are in retracted positions. Bearing means 80 are provided between the inner rotary part or shaft means 20 and the shell 10.

In the operation of the device, an increase in the velocity of the shaft 21 swings the weights 68 outwardly with increased force, tending to move the mechanism 47 rightwardly with greater force so that there will be a tendency to increase the tilt of the wobble plate 61. The reaction of the reaction members formed by the pistons 33 in cooperation with the flow restricting means 37 tends to reduce the speed of the mechanism 47 and the springs 70 then act to swing the weights 68 inwardly so that the mechanism 47 and its wobble producing member may swing leftwardly. Until such time as the wobble plate, reaching its final position of extreme tilt, becomes locked as shown in Fig. 1, the roller 60 will revolve around the axis of the device at a rate much slower than the speed of rotation of the shaft 21, thereby giving a mechanical advantage during the starting period of the vehicle, during which time the engine will operate at relatively high speed while the power output shaft will be driven at a relatively slow speed.

I claim as my invention:

1. In a power transmission: first and second body members supported for rotation on a common axis, there being means to connect one of them to a power source and the other of them to a member to be driven; a plurality of hydraulic reaction members supported by the first of said members, said reaction members having engageable portions disposed around said axis; a wobble plate disposed in confronting relation to said engageable portions of said reaction members so that when said plate is caused to wobble, said reaction members will be caused to reciprocate to an extent depending on the angle of tilt of said plate; and means for imparting wobble to said plate comprising a planetary gear mechanism in said axis including drive and driven gears one of which is connected to said second body member so as to be rotated thereby, and a planetary gear rolling between said drive and driven gears, an eccentric member connected to said planetary gear so as to be moved thereby through a circular path in engagement with said wobble plate eccentrically of said axis, and means to move said gear mechanism bodily along said axis so that said eccentric member will be shifted toward and away from said wobble plate and vary the tilt thereof as it is caused to wobble.

2. A transmission as defined in claim 1 having an annular member supporting said planetary gear and said eccentric member in their operative relations to said drive and driven gears and said plate, said annular member being disposed between said drive and driven gears.

3. A transmission as defined in claim 1 wherein said reaction members comprise pistons operating in cylinders having inlet check valves for the free entry of liquid into said cylinders and orifice means for the restricted flow of liquid from said cylinders, and wherein said planetary gear mechanism has an annular member supporting said planetary gear and said eccentric member in their operative relations to said drive and driven gears and said wobble plate and being disposed so as to act as a thrust bearing between said drive and driven gears.

4. A transmission as defined in claim 1 wherein said planetary gear mechanism has a shell around said drive and driven gears to prevent their disengagement from said planetary gear, and an annular thrust bearing member is disposed between said drive and driven gears and has means adapted to support said planetary gear and said eccentric member.

5. A transmission as defined in claim 1 having a shell to enclose said reaction members and being adapted to contain a liquid, and an expansile-contractile member communicating with the interior of said shell.

6. A transmission as defined in claim 3 wherein said pistons have limited movement arranged to stop rotation of said wobble plate and thereby effect a direct drive between said first and second members.

THOMAS L. MORRIS.

References Cited in the file of this patent

UNITED STATES PATENTS

| Number | Name | Date |
|---|---|---|
| 1,974,354 | Cole | Sept. 18, 1934 |
| 2,276,908 | Schmid | Mar. 17, 1942 |

FOREIGN PATENTS

| Number | Country | Date |
|---|---|---|
| 300,928 | Great Britain | Nov. 16, 1928 |